(12) United States Patent
Carter et al.

(10) Patent No.: US 11,661,644 B2
(45) Date of Patent: May 30, 2023

(54) APPARATUS AND METHOD FOR DIRECT WRITING OF SINGLE CRYSTAL SUPER ALLOYS AND METALS

(71) Applicant: General Electric Company, Schenectady, NY (US)

(72) Inventors: William Thomas Carter, Galway, NY (US); Todd Jay Rockstroh, Maineville, OH (US); Douglas Gerard Konitzer, West Chester, OH (US)

(73) Assignee: General Electric Company, Schenectady, NY (US)

( * ) Notice: Subject to any disclaimer, the term of this patent is extended or adjusted under 35 U.S.C. 154(b) by 814 days.

(21) Appl. No.: 16/451,430

(22) Filed: Jun. 25, 2019

(65) Prior Publication Data

US 2019/0323111 A1 Oct. 24, 2019

Related U.S. Application Data

(63) Continuation of application No. 14/830,759, filed on Aug. 20, 2015, now Pat. No. 10,443,115.

(51) Int. Cl.
*C22F 1/10* (2006.01)
*B23K 26/342* (2014.01)
(Continued)

(52) U.S. Cl.
CPC ............... *C22F 1/10* (2013.01); *B22F 5/04* (2013.01); *B22F 10/20* (2021.01);
(Continued)

(58) Field of Classification Search
None
See application file for complete search history.

(56) References Cited

U.S. PATENT DOCUMENTS 4,359,210 A 11/1982 Peterson
6,074,602 A 6/2000 Wukusick et al.
(Continued)

FOREIGN PATENT DOCUMENTS

EP 2565294 A1 3/2013
GB 2453945 A 4/2009
(Continued)

OTHER PUBLICATIONS

European Search Report Corresponding to Application No. 16184982 dated Dec. 21, 2016.
(Continued)

*Primary Examiner* — Geoffrey S Evans
(74) *Attorney, Agent, or Firm* — Dority & Manning, P.A.

(57) ABSTRACT

Methods for direct writing of single crystal super alloys and metals are provided. The method can include: heating a substrate positioned on a base plate to a predetermined temperature using a first heater; using a laser to form a melt pool on a surface of the substrate; introducing a superalloy powder to the melt pool; measuring the temperature of the melt pool; receiving the temperature measured at a controller; and using an auxiliary heat source in communication with the controller to adjust the temperature of the melt pool. The predetermined temperature is below the substrate's melting point. The laser and the base plate are movable relative to each other, with the laser being used for direct metal deposition. An apparatus is also generally provided for direct writing of single crystal super alloys and metals.

19 Claims, 9 Drawing Sheets

(51) Int. Cl.

| | | |
|---|---|---|
| *B33Y 10/00* | (2015.01) | |
| *B33Y 30/00* | (2015.01) | |
| *B23K 26/03* | (2006.01) | |
| *B33Y 50/02* | (2015.01) | |
| *B22F 5/04* | (2006.01) | |
| *B22F 10/20* | (2021.01) | |
| *B33Y 80/00* | (2015.01) | |
| *B23K 26/144* | (2014.01) | |
| *B23K 26/70* | (2014.01) | |
| *B23K 26/00* | (2014.01) | |
| *B23K 26/14* | (2014.01) | |
| *B23K 101/00* | (2006.01) | |
| *B23K 103/08* | (2006.01) | |
| *B22F 10/30* | (2021.01) | |
| *F01D 5/18* | (2006.01) | |
| *F01D 5/28* | (2006.01) | |
| *F01D 9/02* | (2006.01) | |

(52) U.S. Cl.
CPC ........ *B23K 26/0006* (2013.01); *B23K 26/034* (2013.01); *B23K 26/144* (2015.10); *B23K 26/1464* (2013.01); *B23K 26/342* (2015.10); *B23K 26/703* (2015.10); *B33Y 10/00* (2014.12); *B33Y 30/00* (2014.12); *B33Y 50/02* (2014.12); *B33Y 80/00* (2014.12); *B22F 10/30* (2021.01); *B22F 2999/00* (2013.01); *B23K 2101/001* (2018.08); *B23K 2103/08* (2018.08); *F01D 5/18* (2013.01); *F01D 5/28* (2013.01); *F01D 9/02* (2013.01); *F05D 2220/32* (2013.01); *F05D 2230/30* (2013.01); *F05D 2260/20* (2013.01); *F05D 2300/175* (2013.01); *Y02P 10/25* (2015.11)

(56) References Cited

U.S. PATENT DOCUMENTS

| | | | |
|---|---|---|---|
| 6,122,564 A | 9/2000 | Koch et al. | |
| 6,872,910 B2 | 3/2005 | Tanaka et al. | |
| 7,984,547 B2 | 7/2011 | Steinhardt | |
| 8,186,414 B2 | 5/2012 | Furlong et al. | |
| 8,426,765 B2 | 4/2013 | Arjakine et al. | |
| 8,618,434 B2 | 12/2013 | Chen et al. | |
| 9,468,973 B2 | 10/2016 | Ljungblad | |
| 9,550,255 B2 | 1/2017 | Richter et al. | |
| 10,625,374 B2 | 4/2020 | Schwarze | |
| 2006/0054079 A1* | 3/2006 | Withey | B23K 35/0244 117/108 |
| 2009/0255102 A1 | 10/2009 | McMasters et al. | |
| 2011/0042031 A1 | 2/2011 | Furlong et al. | |
| 2011/0135952 A1 | 6/2011 | Morris et al. | |
| 2011/0285061 A1 | 11/2011 | McAlea et al. | |
| 2012/0040467 A1* | 2/2012 | Clark | G01N 31/22 436/80 |
| 2015/0322799 A1 | 11/2015 | Xu | |
| 2016/0101433 A1* | 4/2016 | Bruck | C22C 19/00 428/668 |
| 2016/0258045 A1 | 9/2016 | Carter, Jr. et al. | |
| 2016/0326880 A1 | 11/2016 | Slavens et al. | |
| 2017/0274476 A1* | 9/2017 | Mazumder | B23K 26/702 |

FOREIGN PATENT DOCUMENTS

| | | |
|---|---|---|
| JP | 2003/048053 A | 2/2003 |
| JP | 2011/167768 A | 9/2011 |
| JP | 2011/528075 A | 11/2011 |
| JP | 2016/516888 A | 6/2016 |
| JP | 2016/529389 A | 9/2016 |
| WO | WO2011/050765 A1 | 5/2011 |
| WO | WO2014/113444 A1 | 9/2014 |

OTHER PUBLICATIONS

Machine Translated Japanese Search Report Corresponding to Application No. 2016159464 dated Aug. 8, 2017.

Brazilian Search Report Corresponding to Application No. 102016019180 dated Oct. 9, 2019.

Indian Search Report Corresponding to Application No. 201644028192 dated Dec. 4, 2019.

* cited by examiner

APPARATUS AND METHOD FOR DIRECT WRITING OF SINGLE CRYSTAL SUPER ALLOYS AND METALS

PRIORITY INFORMATION

The present application claims priority to, and is a continuation of, U.S. patent application Ser. No. 14/830,759 filed on Aug. 20, 2015, which is incorporated by reference herein.

FIELD OF THE INVENTION

The present disclosure relates to an apparatus and method for direct writing of single crystal super alloys and metals.

BACKGROUND OF THE INVENTION

The turbine section of a gas turbine engine is located downstream of a combustor section and contains a rotor shaft and one or more turbine stages, each having a turbine disk (rotor) mounted or otherwise carried by the shaft and turbine blades mounted to and radially extending from the periphery of the disk. Components within the combustor and turbine sections are often formed of superalloy materials to provide acceptable mechanical properties while at elevated temperatures resulting from the hot combustion gases. Higher compressor exit temperatures in modern high pressure ratio gas turbine engines can also necessitate the use of high performance nickel superalloys for compressor disks, bladed disks, and other components. Suitable alloy compositions and microstructures for a given component depend on the particular temperatures, stresses, and other conditions to which the component is subjected.

For example, airfoil components such as blades and vanes are often formed of equiaxed, directionally solidified (DS), or single crystal (SX) superalloys. Directionally solidified (DS) or single-crystal (SX) turbine airfoils have far superior creep strength, thermal fatigue resistance as well as corrosion resistance when compared to equiaxed crystal counterparts. In particular uses, DS or SX turbine airfoils have proven to have as much as nine times more relative life in terms of creep strength and thermal fatigue resistance and over three times more relative life for corrosion resistance, when compared to equiaxed crystal counter parts.

However, single crystal casting is a slow and expensive process. In the event of a change in design, a new mold has to be fabricated. Due to high melting temperature of the Nickel superalloy, often expensive ceramic molds are required. On the other hand, digital manufacturing methods, if successfully applied, can make a single crystal without a mold and thus enable design change economic.

BRIEF DESCRIPTION OF THE INVENTION

Aspects and advantages of the invention will be set forth in part in the following description, or may be obvious from the description, or may be learned through practice of the invention.

Methods are generally provided for direct writing of single crystal super alloys and metals. In one embodiment, the method includes: heating a substrate positioned on a base plate to a predetermined temperature using a first heater; using a laser to form a melt pool on a surface of the substrate; introducing a superalloy powder to the melt pool; measuring the temperature of the melt pool; receiving the temperature measured at a controller; and using an auxiliary heat source in communication with the controller to adjust the temperature of the melt pool. The predetermined temperature is below the substrate's melting point. The laser and the base plate are movable relative to each other, with the laser being used for direct metal deposition.

In one embodiment, the method includes: heating a substrate to a predetermined temperature using a first heater; using a laser to form a melt pool on a surface of the substrate that is positioned on a base plate; introducing a superalloy powder to the melt pool; measuring the temperature of the melt pool; receiving the temperature measured at a controller; and using a cooling source in communication with the controller to adjust the temperature of the substrate. The predetermined temperature is below the substrate's melting point. The laser and the base plate are movable relative to each other with the laser being used for direct metal deposition.

An apparatus is also generally provided for direct writing of single crystal super alloys and metals. In one embodiment, the apparatus includes: a laser having a power output; a base plate configured for holding a substrate thereon; a DMD head configured to supply a stream of superalloy powder onto the substrate; an induction heating source positioned to heat the substrate on the base plate to a predetermined temperature; at least one of an auxiliary heating means and a cooling means; and a controller for controlling the at least one of the auxiliary heating means and the cooling means, wherein the controller is responsive to a measured temperature of at least one of a melt pool on the substrate and the substrate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Direct Metal Deposition (DMD), a digital additive manufacturing process, uses an intelligent closed-loop feedback system to provide an economical solution for advanced Gas Turbine Technology. Methods and apparatus are generally provided herein for the direct writing of three dimensional single crystals shapes facilitated by maintaining the temperature gradient at the solid liquid interface within a very narrow window close to being a constant.

Figure 1:
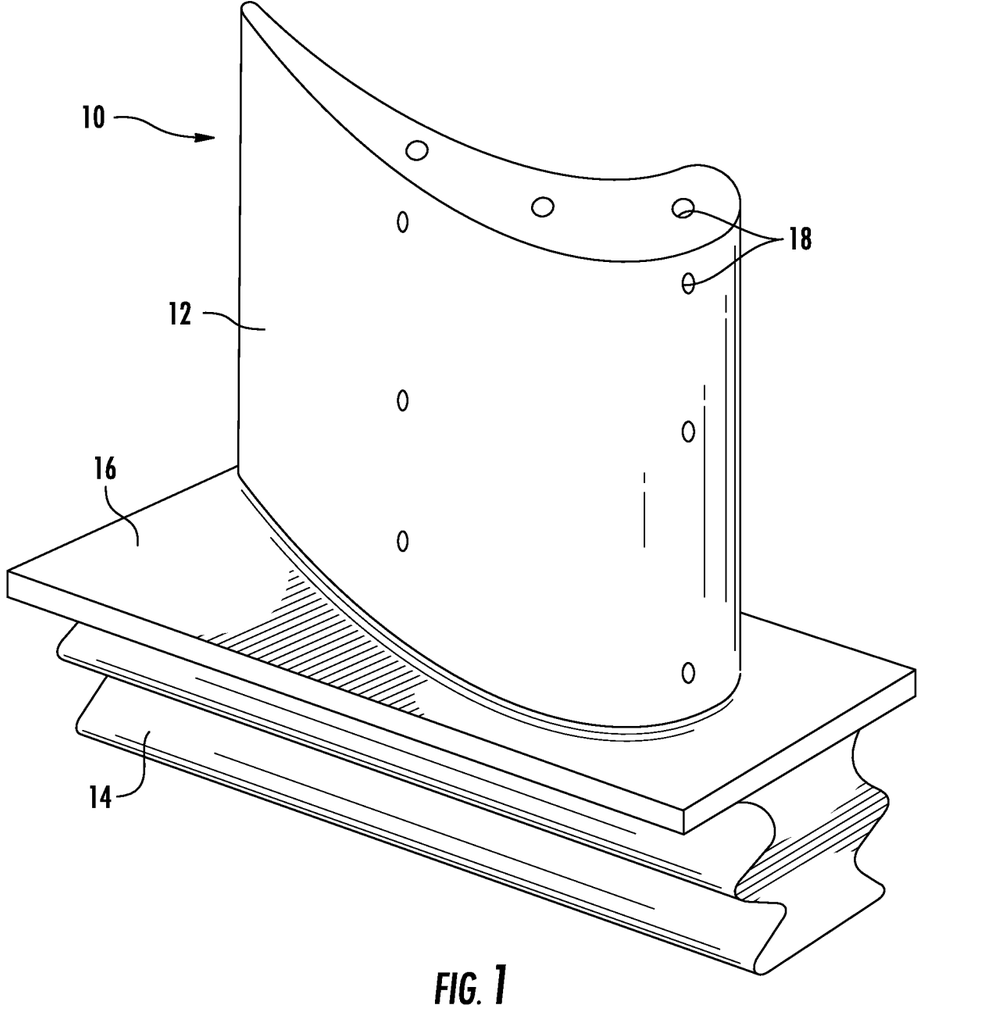
FIG. 1 is a perspective view of an article, such as a gas turbine blade, according to an embodiment of the invention.

Such three dimensional single crystal shapes have a particular utility as a blade of a gas turbine engine. Referring to the drawings, FIG. 1 depicts an article 10 of a gas turbine engine, illustrated as a gas turbine blade. The gas turbine blade 10 includes an airfoil 12, a laterally extending platform 16, an attachment 14 in the form of a dovetail to attach the gas turbine blade 10 to a turbine disk (not shown). In some components, a number of cooling channels extend through the interior of the airfoil 12, ending in openings 18 in the surface of the airfoil 12.

In an exemplary embodiment, the component article 10 is substantially a single crystal. That is, the component article 10 is at least about 80 percent by volume, and more preferably at least about 95 percent by volume, a single grain with a single crystallographic orientation. There may be minor volume fractions of other crystallographic orientations and also regions separated by low-angle boundaries. The single-crystal structure is prepared by the directional solidification of an alloy composition, usually from a seed or other structure that induces the growth of the single crystal and single grain orientation.

The use of exemplary alloy compositions discussed herein is not limited to the gas turbine blade 10, and it may be employed in other articles such as gas turbine nozzles, vanes, shrouds, or other components for gas turbine engines.

Figure 2:
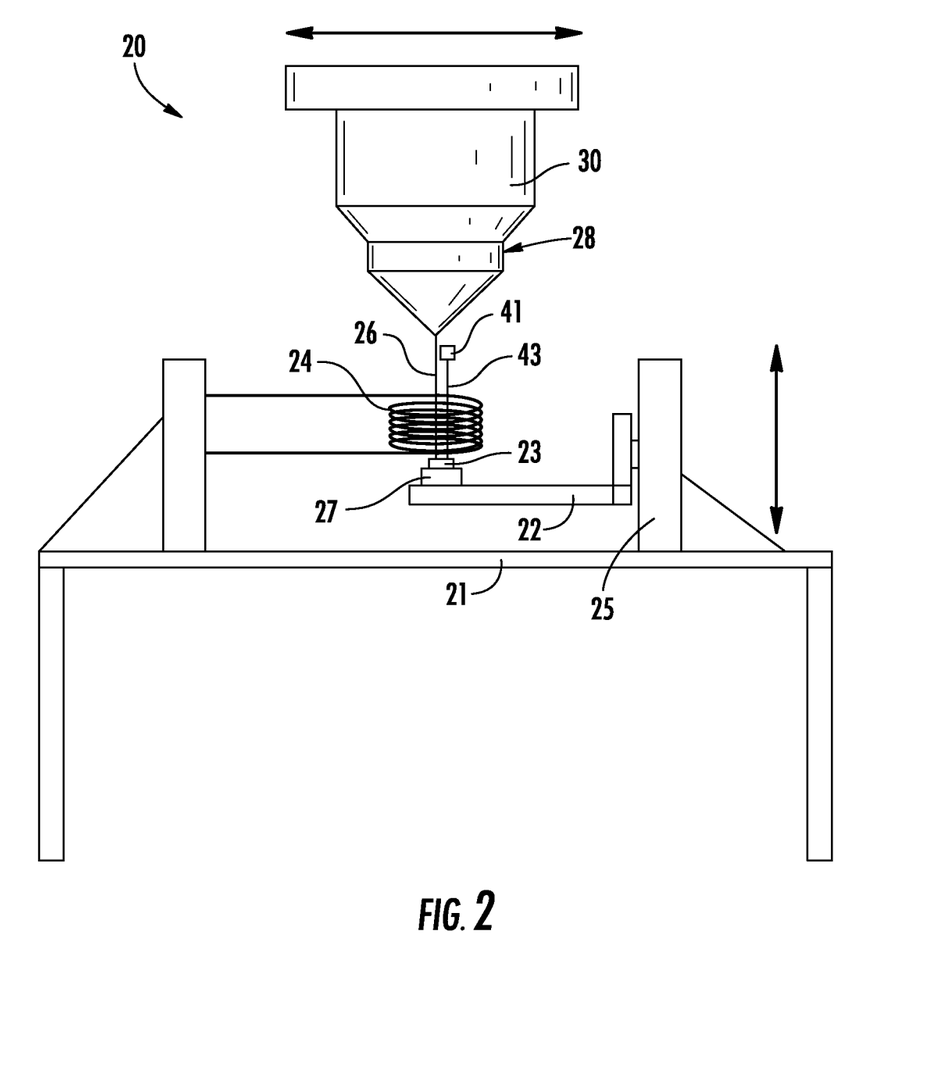
FIG. 2 illustrates an exemplary apparatus according to one embodiment.

Referring to FIG. 2, an apparatus 20 is generally shown for providing a stable temperature gradient and environment for SX growth using a process similar to the floating zone method used for manufacturing semiconductors. The apparatus 20 generally includes a worktable 21 with which other components are arranged. A single crystal base plate 22 is used to initiate epitaxial growth. A single-crystal substrate 23 is shown positioned on a platform 27 on the single-crystal base plate 22. The single-crystal base plate 22 is movable in the vertical direction with respect to the apparatus 20. As shown, a linear motion stage 25 is positioned on the work table 21 to control the vertical movement of the single-crystal base plate 22.

In one embodiment, the substrate is a single-crystal seed having substantially the same composition as the deposit. For example, both the substrate and the material deposited can be a nickel-based super alloy, such as the nickel-base superalloy commercially known as René N5, disclosed in U.S. Pat. No. 6,074,602.

An induction heat source 24 is introduced in order to keep a steady temperature gradient on the single-crystal substrate 23. As shown, the induction heat source 24 is a heating coil that is static with respect to the apparatus 20. As such, the single-crystal base plate 22 can be moved vertically with respect to the induction heating source 24 to control the distance of the single-crystal substrate 23 from the induction heating source 24. When positioned on the platform 27, the substrate 23 can be positioned within the induction heat source 24.

A laser 26 is shown exiting the DMD head 28 for growing a single-crystal on the single-crystal substrate 23. As shown, a 4 kW laser 26 is used for forming single crystal Ni-based superalloy specimens. However, any laser or heat source such as electron beam with enough power to melt metal powder will be adequate for the process. The experiments described in the embodiment shown only uses few hundred watts out of 4 KW. The DMD head 28 is movable in the horizontal plane, in both the X and Y axis, to allow control of the location of the laser 26. Thus, the apparatus 10 allows for a 3-axis motion stage for forming single crystal specimens.

Figure 3:
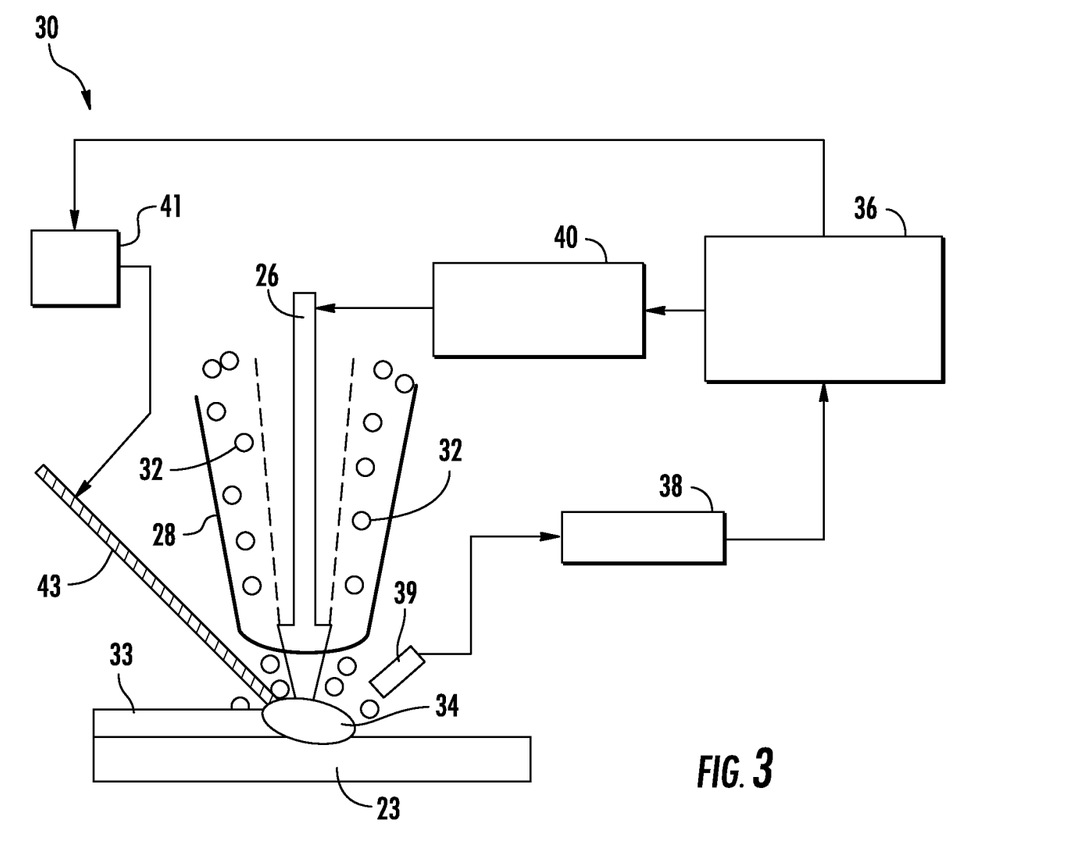
FIG. 3 illustrates a melt pool temperature control process according to one embodiment utilizing the apparatus of FIG. 2.

As more particularly shown in FIG. 3, the DMD head 28 utilizes a DMD powdered metal delivery system 30 for flowing a superalloy powder 32 to the melt pool 34 generated by the laser 26. In one embodiment, the superalloy powder 32 includes a nickel-based superalloy powder. However, any suitable superalloy can be included in the powder 32 as desired.

By using the induction heating source 24, the temperature of the single crystal substrate 23 is increased to near melting temperature (e.g., about 1200° C. when the substrate 23 is a Ni-based superalloy). The induction heating source 24 helps to maintain the thermal gradient on the solid and liquid interface.

The powder 32 is then deposited onto the single crystal substrate 23 when a melt pool 34 is formed from the clad 33 due to the addition of the laser 26 contacting the powder 32 and the substrate 23. That is, the addition of energy from the laser 26 raises the local temperature of the powder 32 and the single-crystal substrate 23 to form the melt pool 34.

The cladding is a composition similar to the composition of the substrate. The metal powder is generally gas-atomized metal powder of a suitable size and chemical composition for achieving the desired chemistry in the cladding.

In a particular embodiment, the deposition atmosphere is formed from an inert gas (e.g., Ar, He, $N_2$, etc.) for oxidation protection. For example, an inert gas can flow through the deposition chamber (not shown) containing the apparatus 10.

Referring now to FIG. 3, a melt pool temperature controller 36 is generally shown. The melt pool temperature controller 36 is configured to maintain a substantially constant melt pool temperature, maintaining the thermal gradient on the solid and liquid interface. A pyrometer 38 and its lens 39 measures a temperature of the melt pool 34 and sends an analog signal to the controller 36. The controller 36 processes converting the analog signal to actual temperature of the melt pool 34 and compares between the temperature of melt pool 34 and a reference temperature, which gives the best quality of deposition.

If the temperature of melt pool 34 is higher than the reference temperature, the controller 36 sends a lower voltage of a signal to the laser power controller 40 to decrease the laser power. In case the melt pool temperature is lower than the reference temperature, the controller 36 increases a laser power. As the crystal grows, the lower part will begin to cool since laser heat source is farther away, resulting in perturbation of the solid-liquid interface temperature gradient. The induction heating source 24 rectifies this problem.

FIGS. 2 and 3 show one embodiment that includes an auxiliary heat source 41, shown in the form of laser 43, in communication with the controller 36 to adjust the temperature of the melt pool. If the temperature of melt pool 34 is higher than the reference temperature, the controller 36 sends a lower voltage of a signal to the auxiliary heat source 41 to decrease the power of the auxiliary laser 43. If the temperature of melt pool 34 is lower than the reference temperature, the controller 36 sends a higher voltage of a signal to the auxiliary heat source 41 to increase the power of the auxiliary laser 43.

Figure 4:
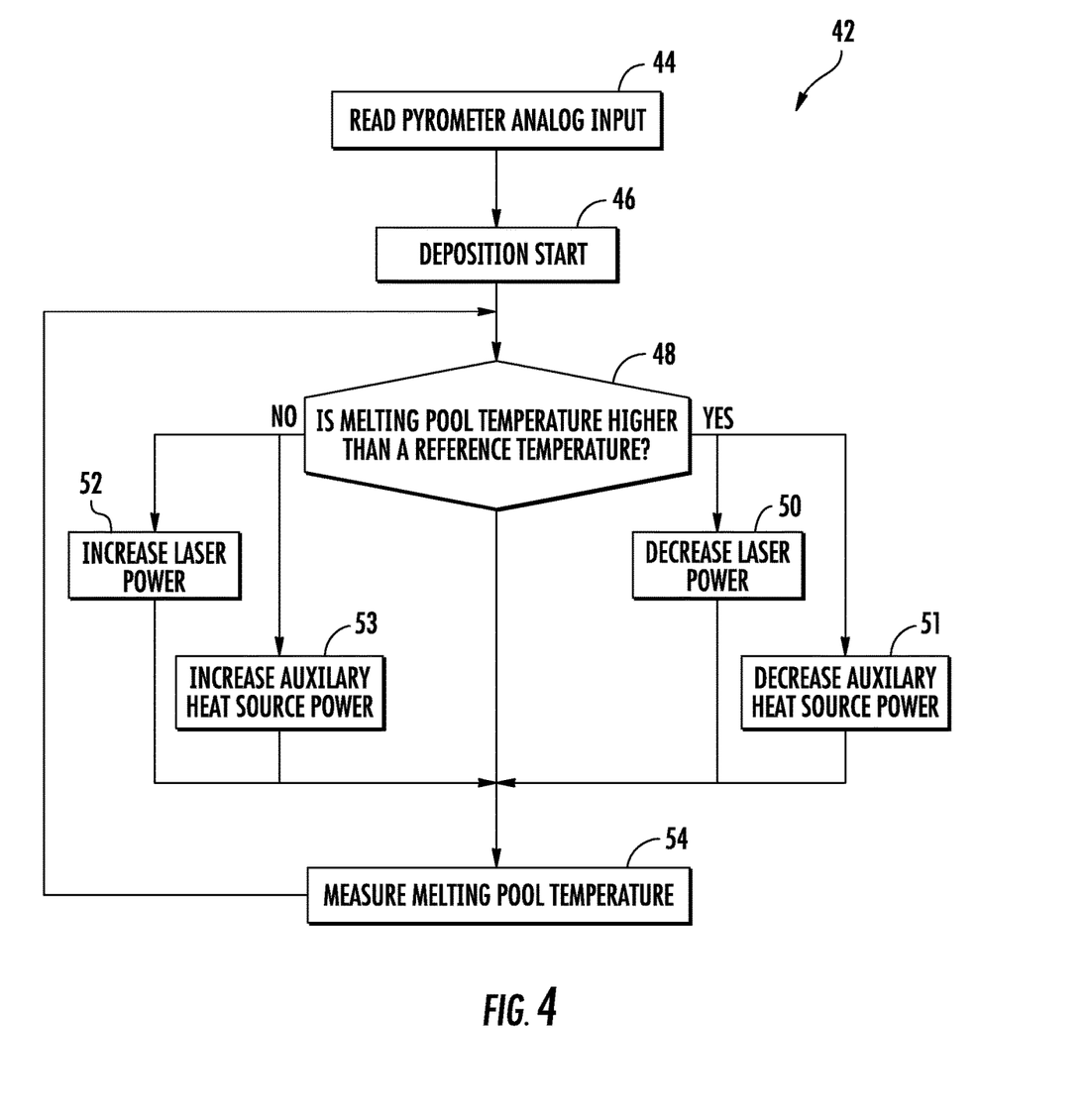
FIG. 4 is a flow chart of an algorithm for the melt pool temperature controller according to one embodiment.

FIG. 4 shows an exemplary method 42 for use by the controller 36. At 44, the pyrometer analog input is read to determine the temperature of the melt pool. At 46, the deposition process starts. At 48, the melting pool temperature is compared to the reference temperature. If the melting point temperature is higher than the reference temperature, then a signal is sent to the laser power controller to decrease the laser power at 50 and/or to the auxiliary heat source controller (e.g., an auxiliary laser power controller) to decrease the power of the auxiliary heat source (e.g., an auxiliary laser) at 51. Conversely, if the melting point temperature is lower than the reference temperature, then a signal is sent to the laser power controller to increase the laser power at 52 and/or to the auxiliary heat source controller (e.g., an auxiliary laser power controller) to increase the power of the auxiliary heat source (e.g., an auxiliary laser) at 53. At 54, the melting pool temperature is measured, and the process repeats. Thus, the melting pool temperature can be controlled in real-time during deposition.

FIGS. 5-8 show embodiments that includes a cooling source, shown in the form of a cooling chamber 60, in communication with the controller 36 (FIGS. 6 and 8) to adjust the temperature of the substrate 23. Through the positioning of the substrate 23 within the cooling chamber 60, the thermal gradient in the substrate 23 can be controlled by induction heating and/or auxiliary heating at one end of the substrate 23 (e.g., on the melt pool 34) and cooling at the opposite end of the substrate 23. The separated cooling of the substrate 23 and heating of the melt pool 34 leads to a thermal gradient within the growing substrate can be achieved and maintained as desired to a predetermined thermal gradient. In one embodiment, the predetermined thermal gradient is chosen so as to achieve epitaxial crystal growth.

Figure 5:
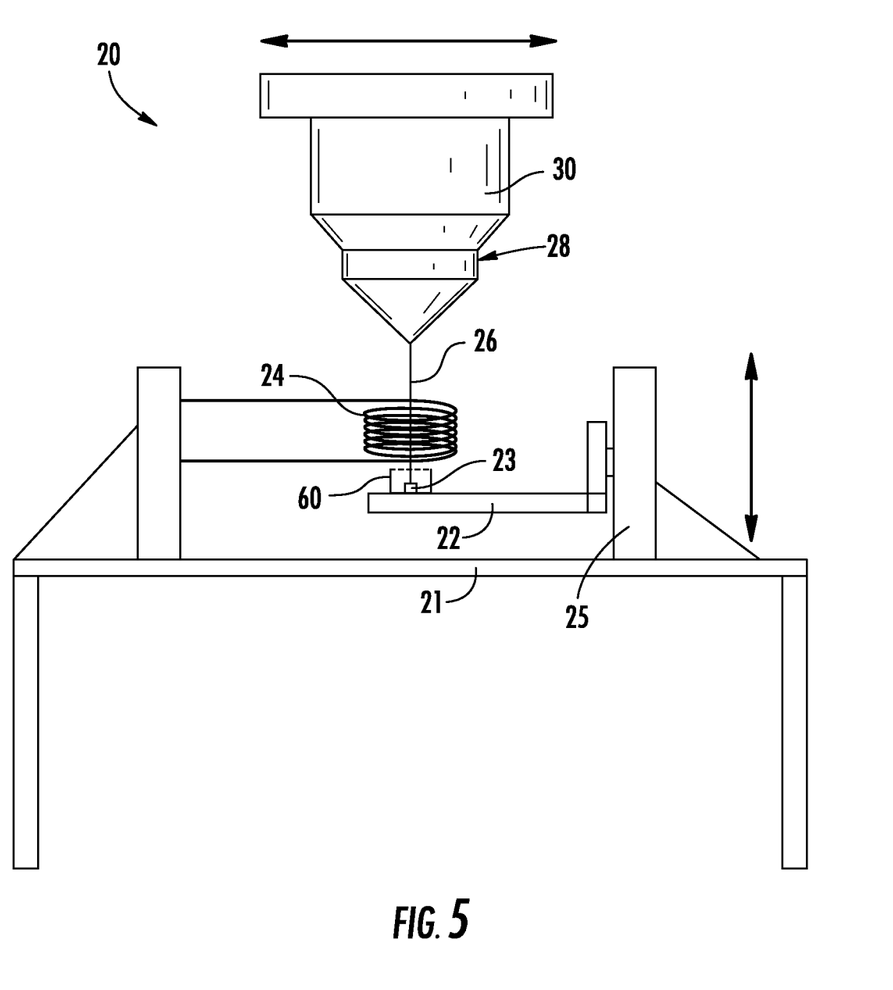
FIG. 5 illustrates another exemplary apparatus according to one embodiment.
Figure 6:
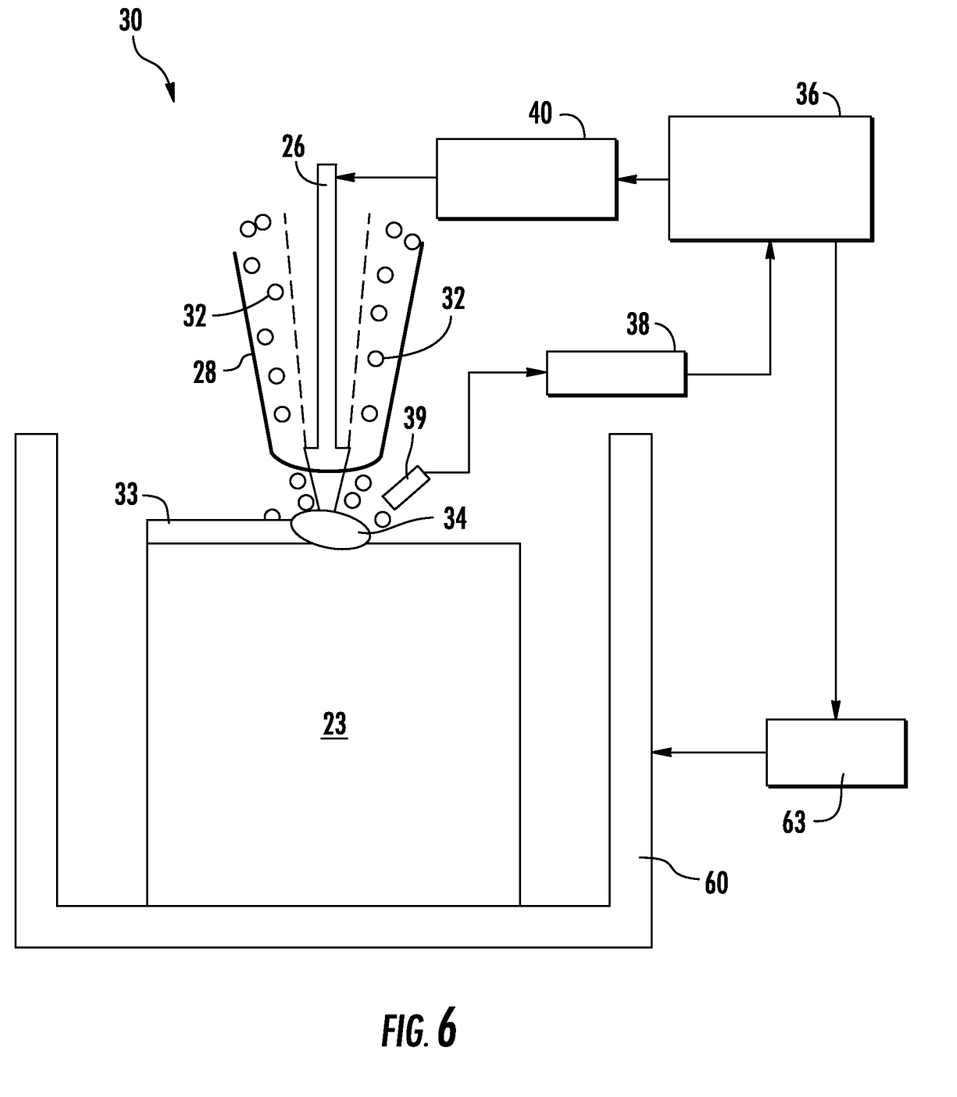
FIG. 6 illustrates a melt pool temperature control process according to one embodiment utilizing the apparatus of FIG. 5.

In the embodiment shown in FIGS. 5 and 6, the cooling chamber 60 is configured to hold the substrate 23 therein, with the induction heat source 24 positioned on an open end of the cooling chamber 60. For example, the cooling chamber 60 can be a closed chamber that includes an open end facing the laser 26. The cooling chamber 60 can utilized radiation for cooling the substrate 23, such as in a Bridgman furnace utilized in conventional casting methods, for cooling of the substrate 23. Referring to FIG. 6, the cooling chamber 60 is shown as a furnace that cools and heats the substrate 23 via radiation from its bottom and/or side surfaces, the temperature of which is adjusted by controller 63. For example, if the temperature of the substrate 23 is higher than a reference temperature (e.g., the temperature gradient between the substrate 23 and the melt pool 34 is not sufficient), the controller 63 decreases the temperature of the chamber 60 so as to cool the substrate 23. Alternatively, if the temperature of the substrate 23 is lower than a reference temperature (e.g., the temperature gradient between the substrate 23 and the melt pool 34 is too great), the controller 63 sends a signal to decrease the temperature of the chamber 60 so as to warm the substrate 23.

Figure 7:
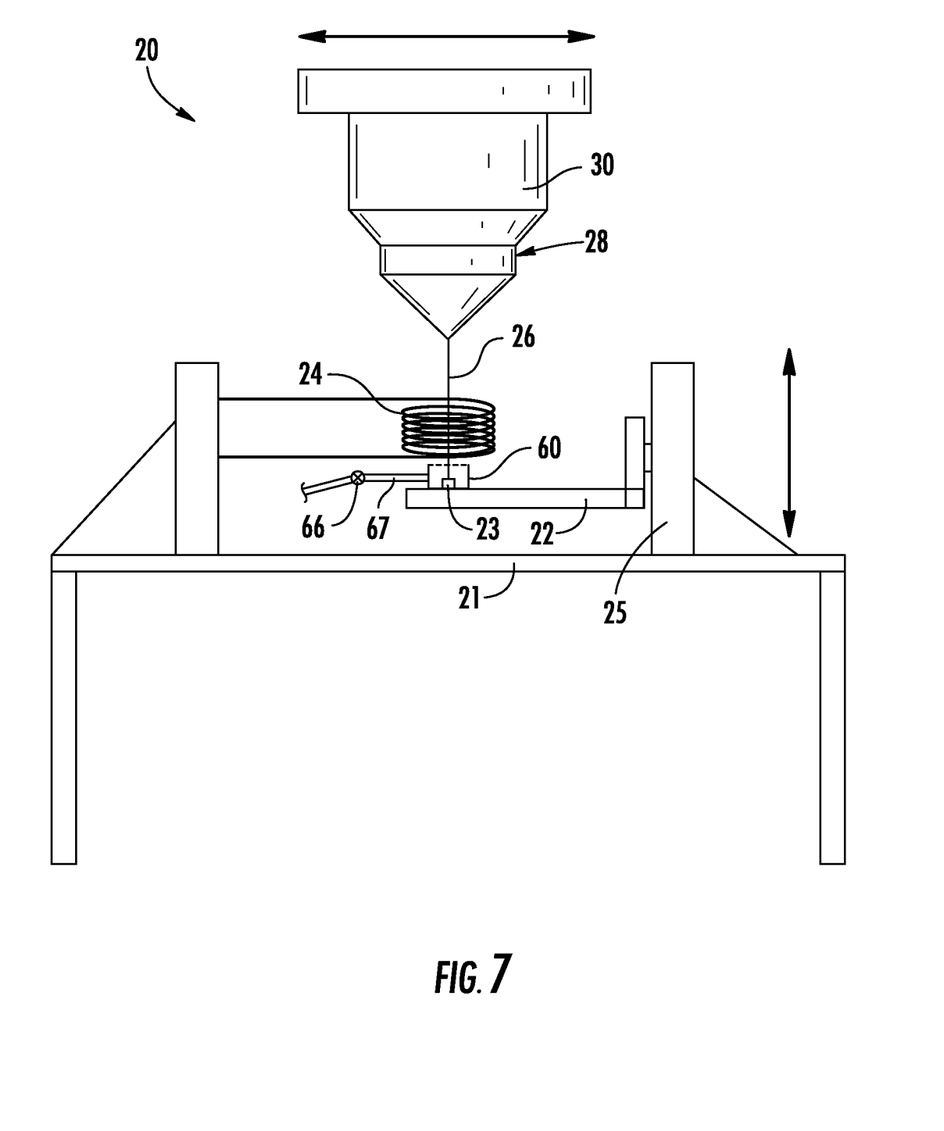
FIG. 7 illustrates another exemplary apparatus according to one embodiment.
Figure 8:
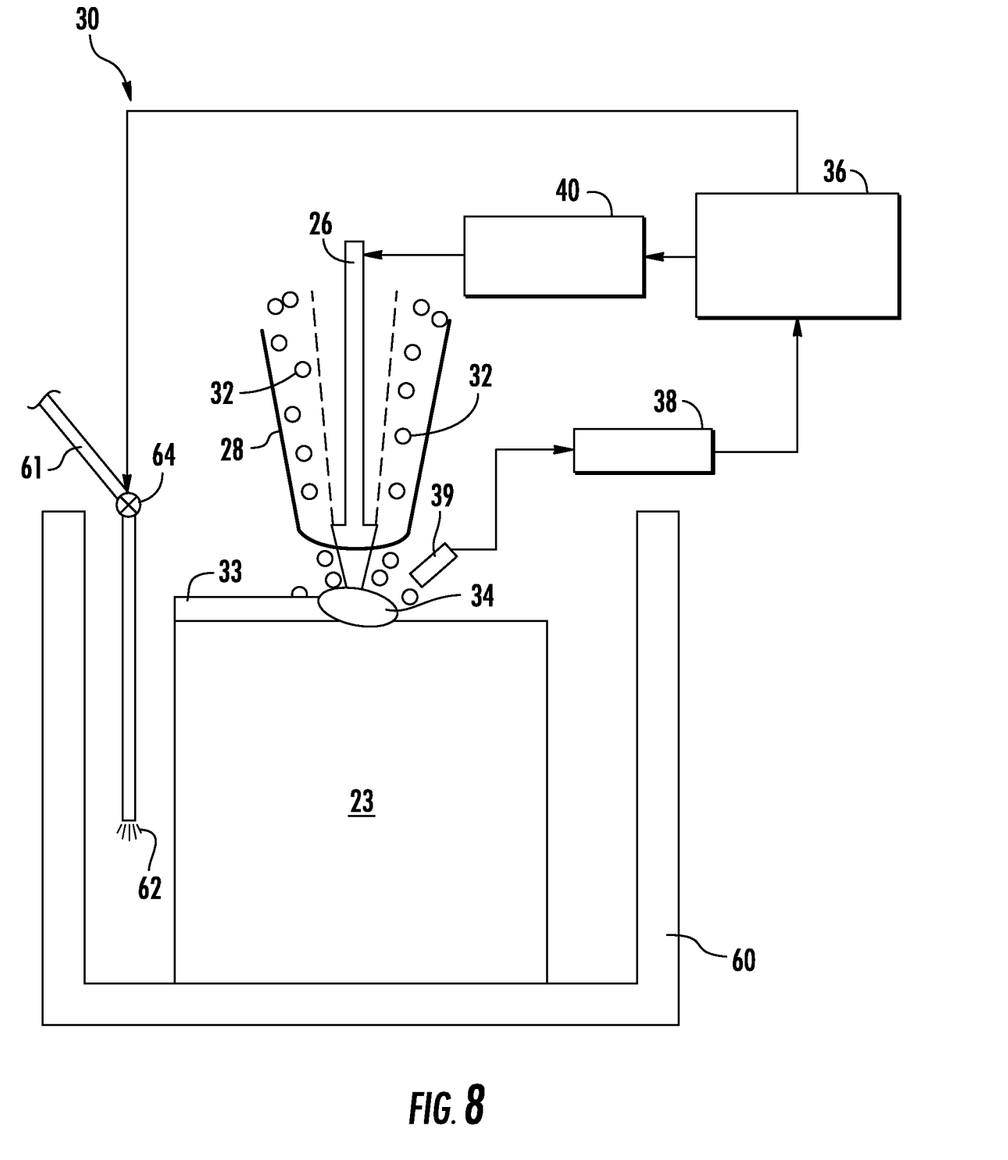
FIG. 8 illustrates a melt pool temperature control process according to one embodiment utilizing the apparatus of FIG. 7.

Alternatively, the embodiment of FIGS. 7 and 8 shows the cooling chamber 60 including a gas supply line 61 providing a cooling gas 62 into the cooling chamber 60 to control the temperature of the substrate 23. Referring to FIG. 8, a valve 64 is in the supply line 61 and is in communication with the controller 36 to adjust the flow of cooling gas 62 to the cooling chamber 60. If the temperature of substrate 23 is higher than the desired temperature (e.g., not enough of a temperature gradient between the melt pool 34 and the substrate 23), the controller 36 sends a signal to the adjustable valve 64 in the supply tube 60 to increase the flow rate of the gas jets 62. If the temperature of substrate 23 is lower than the desired temperature (e.g., too much of a temperature gradient between the melt pool 34 and the substrate 23), the controller 36 sends a signal to the adjustable valve 64 in the supply tube 60 to decrease the flow rate of the gas jets 62.

The temperature of the substrate 23 can be measured by any suitable device, such as a pyrometer, a thermal imaging device, etc., which may be the same device that measures the melt pool temperature or a different device. In one embodiment, a thermal imaging device can be utilized to not only measure the temperature of the substrate 23 at a single point, but also measure the temperature of the substrate at multiple points to determine the temperature gradient along the substrate 23.

Figure 9:
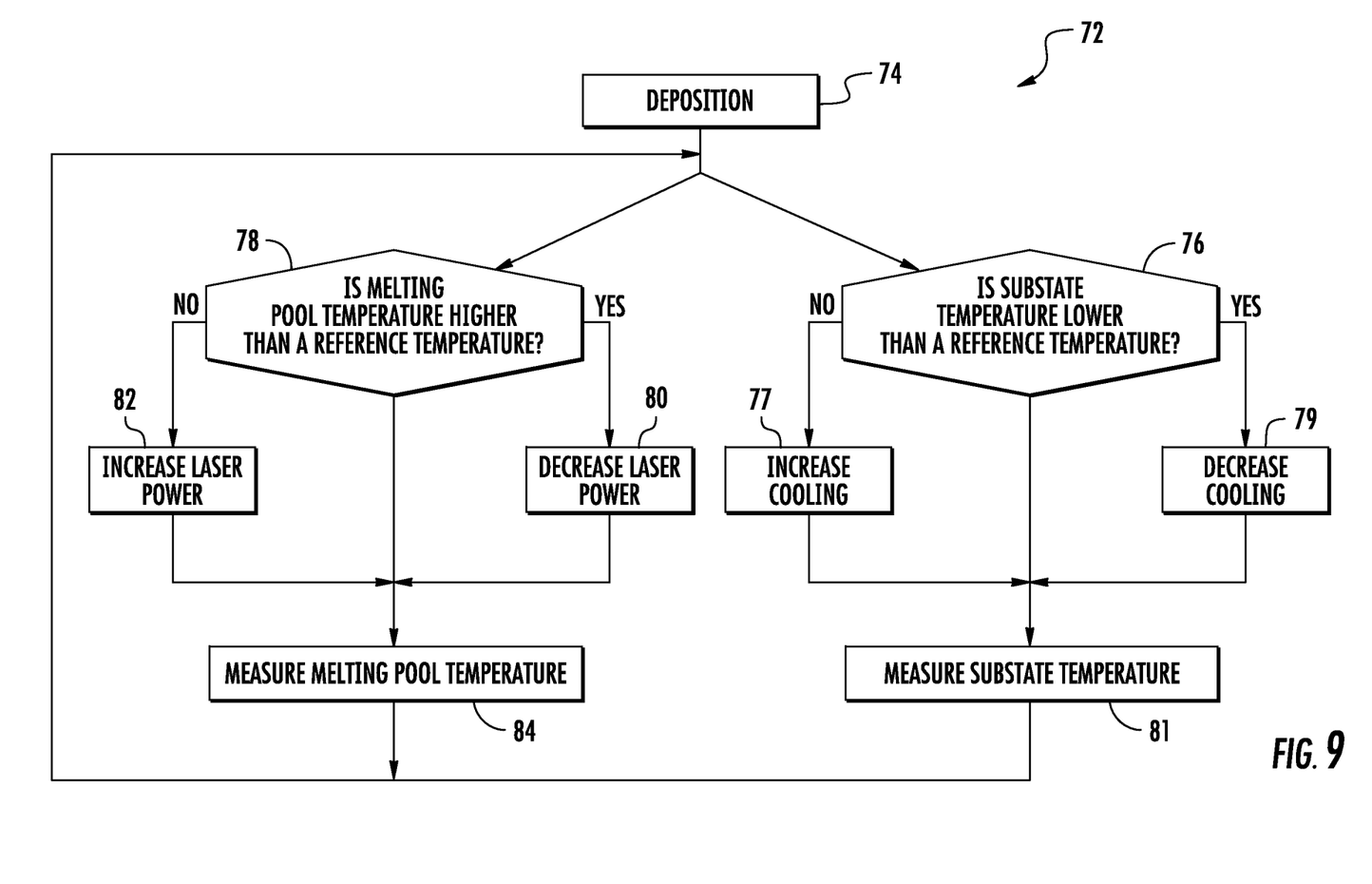
FIG. 9 is a flow chart of an algorithm for the melt pool temperature controller according to one embodiment.

FIG. 9 shows an exemplary method 72 for use by the controller 36. At 74, the deposition process starts. At 78, the melting pool temperature is compared to the reference temperature. If the melting point temperature is higher than the reference temperature, then a signal is sent to the laser power controller to decrease the laser power at 80. Conversely, if the melting point temperature is lower than the reference temperature, then a signal is sent to the laser power controller to increase the laser power at 82. At 84, the melting pool temperature is measured, and the process repeats. Thus, the melting pool temperature can be controlled in real-time during deposition. Simultaneously, the temperature of the substrate is measured at 76 and compared to a reference temperature. If the substrate temperature is lower than the reference temperature, then a signal is sent to the cooling chamber to decrease cooling at 79. Conversely, if the substrate temperature is higher than the reference temperature, then a signal is sent to the cooling chamber to increase the cooling at 77. At 81, the substrate temperature is measured, and the process repeats. As such, real-time monitoring of both the temperature of the melt pool and the substrate can be measured and adjusted, which can lead to control of the temperature gradient therebetween.

It should be noted that the embodiments shown in FIGS. 2-8 can be combined into a single system. That is, both an auxiliary heat source 41 and a cooling source 62 can be utilized in the apparatus 20 simultaneously and in conjunction with each other.

In one embodiment, the controller 36 and/or the laser power controller 40 may comprise a computer or other suitable processing unit. Thus, in several embodiments, the controller 36 may include suitable computer-readable instructions that, when implemented, configure the controller 36 to perform various different functions, such as receiving, transmitting and/or executing laser power output control signals, auxiliary heat source power control signals, and/or cooling source control signals.

A computer generally includes a processor(s) and a memory. The processor(s) can be any known processing device. Memory can include any suitable computer-readable medium or media, including, but not limited to, RAM, ROM, hard drives, flash drives, or other memory devices. Memory stores information accessible by processor(s), including instructions that can be executed by processor(s). The instructions can be any set of instructions that when executed by the processor(s), cause the processor(s) to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

Memory can also include data that may be retrieved, manipulated, or stored by processor(s). For instance, after receiving the temperature measured from the pyrometer, memory can store the temperature information. Additionally, memory can store reference temperatures for various substrate materials and/or powder materials.

The computing device can include a network interface for accessing information over a network. The network can include a combination of networks, such as Wi-Fi network, LAN, WAN, the Internet, cellular network, and/or other suitable network and can include any number of wired or wireless communication links. For instance, computing device could communicate through a wired or wireless network with the pyrometer, the laser power controller, the auxiliary heat source controller, and/or the cooling source controller.

Growth rate of the single crystal is dependent on the temperature gradient in the solid as shown in the Equation 1:

$$R_{max}=(K_s \cdot G_s)/(p_s \cdot H)$$

where: $R_{max}$ is the maximum crystal growth rate, $K_s$ is the thermal conductivity of the solid deposited crystal, $G_s$ is the temperature gradient at the solid-liquid interface, $P_s$ is the solid density, and H is the latent heat of fusion. It should be noted that $K_s$, $P_s$ and H are materials properties and cannot be controlled by the process, but $G_s$ can be. Therefore, combined Laser and Induction heating provides additional parameters to increase the growth rate.

The present teachings thereby remove the need for an expensive mold for growing single crystal and thus the lead time from concept to realization. Thus, the dual heating system provides the process flexibility and route to increase the productivity. It is anticipated that, in some embodiments, alternative heat sources, other than Laser and Induction, can be used. Such alternative heat sources can include Electron Beam, Plasma arc, electric arc, resistive heating etc. However, a revised control algorithm may be required for the particular heat source used.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for direct writing of single crystal super alloys and metals, the method comprising:
   heating a substrate to a predetermined temperature using a first heater, wherein the predetermined temperature is below the substrate's melting point;
   using a first laser to form a melt pool on a surface of the substrate, wherein the substrate is positioned on a base plate, and wherein the first laser and the base plate are movable relative to each other, the first laser being used for direct metal deposition;
   introducing a superalloy powder to the melt pool;
   measuring the temperature of the melt pool;
   receiving the temperature measured at a controller; and
   using a second laser in communication with the controller to adjust the temperature of the melt pool.

2. The method of claim 1, wherein the temperature measured is lower than the predetermined temperature, and wherein using the second laser to adjust the temperature of the melt pool comprises:
   increasing power to the second laser.

3. The method of claim 1, wherein the temperature measured is higher than the predetermined temperature, and wherein using the second laser to adjust the temperature of the melt pool comprises:
   decreasing power to the second laser.

4. The method of claim 1, further comprising:
   using a cooling source in communication with the controller to adjust the temperature of the melt pool.

5. The method of claim 4, wherein the cooling source is a cooling gas in communication with the controller to cool at an opposite side of the substrate from the surface such that a thermal gradient is controlled through the second laser and the cooling source.

6. The method of claim 5, wherein the temperature measured is lower than the predetermined temperature, and wherein using the cooling source to adjust the temperature of the melt pool comprises:
   decreasing a gas flow of the cooling gas to the melt pool.

7. The method of claim 5, wherein the temperature measured is higher than the predetermined temperature, and wherein using the cooling source to adjust the temperature of the melt pool comprises:
   increasing a gas flow of the cooling gas to the melt pool.

8. A method for direct writing of single crystal super alloys and metals, the method comprising:
   heating a substrate to a predetermined temperature using a first heater, wherein the predetermined temperature is below the substrate's melting point;
   using a first laser to form a melt pool on a surface of the substrate, wherein the substrate is positioned on a base plate, and wherein the first laser and the base plate are movable relative to each other, the first laser being used for direct metal deposition;
   introducing a superalloy powder to the melt pool;
   measuring the temperature of the melt pool;
   receiving the temperature measured at a controller;
   using a second laser in communication with the controller to adjust the temperature of the melt pool; and
   using a cooling source in communication with the controller to adjust the temperature of the substrate.

9. The method of claim 8, wherein the cooling source is a cooling gas in communication with the controller to cool at an opposite side of the substrate from the surface such that a thermal gradient is controlled through the second laser and the cooling source.

10. The method of claim 9, wherein the temperature measured is lower than the predetermined temperature, and wherein using the cooling source to adjust the temperature of the substrate comprises:

decreasing a gas flow of the cooling gas to the substrate.

11. The method of claim 9, wherein the temperature measured is higher than the predetermined temperature, and wherein using the cooling source to adjust the temperature of the substrate comprises:

increasing a gas flow of the cooling gas to the substrate.

12. The method of claim 8, wherein the cooling source is a furnace, and wherein the substrate is positioned within the furnace.

13. The method of claim 12, wherein the temperature measured is lower than the predetermined temperature, and wherein using the cooling source to adjust the temperature of the substrate comprises:

increasing the temperature of the furnace.

14. The method of claim 12, wherein the temperature measured is higher than the predetermined temperature, and wherein using the cooling source to adjust the temperature of the substrate comprises:

decreasing the temperature of the furnace.

15. An apparatus for direct writing of single crystal super alloys and metals comprising:

a first laser having a power output;

a base plate configured for holding a substrate thereon;

a direct metal deposition (DMD) head configured to supply a stream of superalloy powder onto the substrate, the DMD head also configured to control a location of the first laser;

an induction heating source positioned to heat the substrate on the base plate to a predetermined temperature;

a second laser positioned to heat the substrate on the base plate;

a cooling means; and a controller for controlling the second laser and the cooling means, wherein the controller is responsive to a measured temperature of at least one of a melt pool on the substrate and the substrate.

16. The apparatus as in claim 15, comprising the cooling means, wherein the cooling means comprises a gas source having a variable flow rate controlled by a valve in communication with the controller.

17. The apparatus as in claim 15, comprising the cooling means, wherein the cooling means comprises a furnace into which the substrate is positioned.

18. The apparatus as in claim 15, further comprising:

a pyrometer configured to measure the temperature of the at least one of the melt pool on the substrate or the superalloy powder, wherein the pyrometer is in communication with the controller.

19. The apparatus as in claim 15, wherein the induction heating source is a heating coil.

* * * * *